(12) United States Patent
Kolosnitsyn et al.

(10) Patent No.: US 9,196,929 B2
(45) Date of Patent: Nov. 24, 2015

(54) ELECTROLYTE COMPOSITIONS FOR BATTERIES USING SULPHUR OR SULPHUR COMPOUNDS

(75) Inventors: Vladimir Kolosnitsyn, Ufa (RU); Elena Karaseva, Ufa (RU)

(73) Assignee: Oxis Energy Limited, Oxforshire (GB)

( * ) Notice: Subject to any disclaimer, the term of this patent is extended or adjusted under 35 U.S.C. 154(b) by 0 days.

(21) Appl. No.: 13/153,157

(22) Filed: Jun. 3, 2011

(65) Prior Publication Data

US 2011/0236766 A1    Sep. 29, 2011

Related U.S. Application Data (63) Continuation of application No. 11/332,471, filed on Jan. 17, 2006, now abandoned.

(60) Provisional application No. 60/652,769, filed on Feb. 15, 2005.

(30) Foreign Application Priority Data

Jan. 18, 2005   (GB) .................................. 0501001.2

(51) Int. Cl.
*H01M 10/056* (2010.01)
*H01M 10/0568* (2010.01)
(Continued)

(52) U.S. Cl.
CPC ............ *H01M 10/3918* (2013.01); *H01M 4/13* (2013.01); *H01M 4/136* (2013.01); *H01M 4/40* (2013.01); *H01M 4/58* (2013.01);
(Continued)

(58) Field of Classification Search
CPC .......... H01M 10/056; H01M 10/0568; H01M 10/0569; H01M 10/0565; H01M 10/3918; H01M 4/13; H01M 4/136; H01M 4/40; H01M 4/58; H01M 2010/4292; H01M 2300/0025
See application file for complete search history.

(56) References Cited

U.S. PATENT DOCUMENTS 3,185,590 A    5/1965    Mayer et al.
3,578,500 A    5/1971    Maricle et al.
(Continued)

FOREIGN PATENT DOCUMENTS

EP    0710995    3/2001
EP    1178555 A2    2/2002
(Continued)

OTHER PUBLICATIONS

U.S. Appl. No. 11/190,203, filed Jul. 27, 2005, Kolosnitsyn et al.
(Continued)

*Primary Examiner* — Eugenia Wang
(74) *Attorney, Agent, or Firm* — Meyertons, Hood, Kivlin, Kowert & Goetzel, P.C.; Eric B. Meyertons (57) ABSTRACT

There are disclosed electrolytes comprising solutions of lithium salts with large anions in polar aprotic solvents with a particular concentration of background salts. The concentration of the background salts is selected to be equal or close to the concentration of a saturated solution of these salts in the aprotic solvents used. The electrolytes disclosed can be used in chemical sources of electric energy such as secondary (rechargeable) cells and batteries comprising sulphur-based positive active materials. The use of such electrolytes increases cycling efficiency and cycle life of the cells and batteries.

11 Claims, 10 Drawing Sheets

(51) Int. Cl.

| | | |
|---|---|---|
| *H01M 10/0569* | (2010.01) | |
| *H01M 4/13* | (2010.01) | |
| *H01M 4/136* | (2010.01) | |
| *H01M 4/40* | (2006.01) | |
| *H01M 4/58* | (2010.01) | |
| *H01M 10/39* | (2006.01) | |
| *H01M 10/0565* | (2010.01) | |
| *H01M 10/42* | (2006.01) | |

(52) U.S. Cl.
CPC ....... *H01M 10/056* (2013.01); *H01M 10/0568* (2013.01); *H01M 10/0569* (2013.01); *H01M 10/0565* (2013.01); *H01M 2010/4292* (2013.01); *H01M 2300/0025* (2013.01); *Y02E 60/122* (2013.01)

(56) References Cited

U.S. PATENT DOCUMENTS

| | | | |
|---|---|---|---|
| 3,639,174 | A | 2/1972 | Kengelman |
| 3,778,310 | A | 12/1973 | Garth |
| 3,877,983 | A | 4/1975 | Hovsepian |
| 3,907,591 | A | 9/1975 | Lauck |
| 3,907,597 | A | 9/1975 | Mellors |
| 4,060,674 | A | 11/1977 | Klemann et al. |
| 4,104,451 | A | 8/1978 | Klemann et al. |
| 4,118,550 | A | 10/1978 | Koch |
| 4,154,906 | A | 5/1979 | Bubnick et al. |
| 4,163,829 | A | 8/1979 | Kronenberg |
| 4,252,876 | A | 2/1981 | Koch |
| 4,303,748 | A | 12/1981 | Armand et al. |
| 4,410,609 | A | 10/1983 | Peled et al. |
| 4,499,161 | A | 2/1985 | Foos |
| 4,550,064 | A | 10/1985 | Yen et al. |
| 4,690,877 | A | 9/1987 | Gabano et al. |
| 4,725,927 | A | 2/1988 | Morimoto et al. |
| 4,740,436 | A | 4/1988 | Kobayashi et al. |
| 5,079,109 | A | 1/1992 | Takami et al. |
| 5,219,684 | A | 6/1993 | Wilkinson et al. |
| 5,460,905 | A | 10/1995 | Skotheim |
| 5,462,566 | A | 10/1995 | Skotheim |
| 5,529,860 | A | 6/1996 | Skotheim et al. |
| 5,582,623 | A | 12/1996 | Chu |
| 5,587,253 | A | 12/1996 | Gozdz et al. |
| 5,648,187 | A | 7/1997 | Skotheim |
| 5,744,262 | A | 4/1998 | Cheng et al. |
| 5,789,108 | A | 8/1998 | Chu |
| 5,797,428 | A | 8/1998 | Miller |
| 5,814,420 | A | 9/1998 | Chu |
| 5,919,587 | A | 7/1999 | Mukherjee et al. |
| 5,961,672 | A | 10/1999 | Skotheim et al. |
| 5,962,171 | A | 10/1999 | Boguslavsky et al. |
| 6,030,720 | A | 2/2000 | Chu et al. |
| 6,090,504 | A | 7/2000 | Sung et al. |
| 6,117,590 | A | 9/2000 | Skotheim et al. |
| 6,174,621 | B1 | 1/2001 | Skotheim et al. |
| 6,201,100 | B1 | 3/2001 | Gorkovenko et al. |
| 6,210,831 | B1 | 4/2001 | Gorkovenko et al. |
| 6,245,465 | B1 | 6/2001 | Angell et al. |
| 6,302,928 | B1 | 10/2001 | Xu et al. |
| 6,319,633 | B1 | 11/2001 | Ikeda et al. |
| 6,344,293 | B1 | 2/2002 | Geronov |
| 6,358,643 | B1 | 3/2002 | Katz et al. |
| 6,613,480 | B1 | 9/2003 | Hwang et al. |
| 6,632,573 | B1 | 10/2003 | Nimon et al. |
| 6,706,449 | B2 | 3/2004 | Mikhaylik et al. |
| 6,733,924 | B1 | 5/2004 | Skotheim et al. |
| 6,797,428 | B1 | 9/2004 | Skotheim et al. |
| 2002/0022181 | A1 | 2/2002 | Tsujioka et al. |
| 2002/0034688 | A1 | 3/2002 | Chu et al. |
| 2002/0039677 | A1 | 4/2002 | Iwamoto et al. |
| 2002/0192557 | A1 | 12/2002 | Choi et al. |
| 2003/0073005 | A1 | 4/2003 | Kim et al. |
| 2003/0180611 | A1 | 9/2003 | Mikhaylik et al. |
| 2004/0002002 | A1 | 1/2004 | Mizuta et al. |
| 2004/0048164 | A1 | 3/2004 | Jung et al. |
| 2004/0053129 | A1* | 3/2004 | Jung et al. ............... 429/188 |
| 2004/0096750 | A1 | 5/2004 | Kim et al. |
| 2004/0101753 | A1 | 5/2004 | Hwang |
| 2004/0157132 | A1 | 8/2004 | Kim et al. |
| 2004/0219428 | A1 | 11/2004 | Nagayama |
| 2004/0258996 | A1* | 12/2004 | Kim et al. ............... 429/231.9 |
| 2005/0244693 | A1 | 11/2005 | Strutt et al. |
| 2006/0024579 | A1 | 2/2006 | Kolosnitsyn et al. |
| 2006/0051643 | A1 | 3/2006 | Sarkar et al. |
| 2006/0121355 | A1 | 6/2006 | Kolosnitsyn et al. |
| 2006/0234126 | A1 | 10/2006 | Kolosnitsyn et al. |
| 2006/0292451 | A1 | 12/2006 | Lee et al. |
| 2007/0072076 | A1 | 3/2007 | Kolosnitsyn et al. |
| 2007/0281210 | A1 | 12/2007 | Kolosnitsyn et al. |
| 2008/0038645 | A1 | 2/2008 | Kolosnitsyn et al. |
| 2008/0100264 | A1 | 5/2008 | Kolosnitsyn et al. |
| 2009/0053565 | A1 | 2/2009 | Iacovelli |

FOREIGN PATENT DOCUMENTS

| | | |
|---|---|---|
| EP | 1420475 A2 | 5/2004 |
| GB | 2084391 A | 4/1982 |
| JP | 59194361 | 11/1984 |
| JP | 08069812 | 3/1996 |
| JP | 8-138742 | 5/1996 |
| JP | 08138650 | 5/1996 |
| JP | 08298229 | 11/1996 |
| JP | 08298230 | 11/1996 |
| JP | 09147913 | 6/1997 |
| JP | 10284076 | 10/1998 |
| JP | 11-273729 | 10/1999 |
| WO | WO 01/97304 | 12/2001 |

OTHER PUBLICATIONS

U.S. Appl. No. 11/290,825, filed Dec. 1, 2005, Kolosnitsyn et al.
U.S. Appl. No. 60/721,062, filed Sep. 28, 2005, Kolosnitsyn et al.
U.S. Appl. No. 11/386,113, filed Mar. 22, 2006, Kolosnitsyn et al.
U.S. Appl. No. 12/527,701, filed Jun. 18, 2009, Kolosnitsyn et al.
Kombas S. et al., "Inorganic Electrolyte Additives to Suppress the Degradation of Graphite Anodes by Dissolved Mn(II) for Lithium-Ion Batteries," Journal of Power Sources 119-121, pp. 378-382, 2003.
Chagnes A. et al., "Butyrolactone-ethylene Carbonate Based Electrolytes for Lithium Ion Batteries," Journal of Applied Electrochemistry, vol. 33, pp. 589-595, Netherlands, Feb. 5, 2003.
Linden D. et al. "Handbook of Batteries", Third ed., Mcgraw-Hill, New York, 2001.
Office Action of U.S. Appl. No. 11/190,203, mailed on Oct. 9, 2009.
Office Action of U.S. Appl. No. 11/190,203, mailed on Apr. 3, 2009.
Office Action of U.S. Appl. No. 11/290,825, mailed on Jun. 11, 2009.
Office Action of U.S. Appl. No. 11/386,113, mailed on Jan. 6, 2009.
Office Action of U.S. Appl. No. 11/386,113, mailed on Aug. 19, 2008.
Office Action of U.S. Appl. No. 11/386,113, mailed on Feb. 5, 2008.
Office Action of U.S. Appl. No. 11/526,876, mailed on Oct. 30, 2009.
Office Action of U.S. Appl. No. 11/889,334, mailed on Aug. 14, 2009.
Definitions of "slurry" and "suspension" from Merriam Webster's, Collegiate Dictionary (10th edition), Feb. 4, 2008.
Notice of Allowance of U.S. Appl. No. 11/386,113, mailed on Jul. 24, 2009.
Ragnar, Tischer P., "The Sulfur Electrode: Fused Salts and Solid Electrolyes", New York, Academic Press, 1983.
"Transportation Regulations for Lithium, Lithium Ion and Polymer Cells and Batteries," Ultralife Batteries, Inc. Rev. H, Dec. 18, 2003.
Gholam-Abbas Nazri, Gianfranco Pistoia, "Lithium Batteries: Science and Technology", 2003, pp. 509-573, Hardcover, ISBN: 978-1-4020-7628-2.
Aurbach, Ed D., "Nonaqueous Electrochemistry", New York: Marcel Dekker, 1999, p. 447.
Bach et al. J. Power Sources, 1999, 43-44, 569-575.
Aurbach, D., E. Zinigrad, Y. Cohen, H. Teller, "A Short Review of Failure Mechanisms of Lithium Metal and Lithiated Graphite Anodes in Liquid Electrolyte Solutions," Solid State Ionics, 2002, vol. 148, pp. 405-416.

(56) References Cited

OTHER PUBLICATIONS

Zhong et al., J. Electrochem. Soc. 1997, 144, 205-213.
Chang, Duck-Rye. Suck-Hyun Lee, Sun-Wook Kim, Hee-Tak Kim. "Binary Electrolyte Based on Tetra (ethylene glycol) Dimethyl Ether and 1,3-dioxolane for Lithium-Sulphur Battery", J. Power Sources, 2002, vol. 112, pp. 452-460.
Ein-Eli et al., J. Electrochem. Soc., 1997, 144, L205-L207.
Ein-Eli et al., J. Electrochem. Soc., 1996, 143, L273-277.
International Search Report for PCT/GB2005/002850 mailed Aug. 25, 2005.
Paris, J., V. Plichon, "Electrochemical Reduction of Sulphur in Dimethylacetamide", Electrochimica Acta, 1981, vol. 26, No. 12, pp. 1823-1829.
UK Search Report under Section 17 taken from Application No. GB 0501001.2, Apr. 14, 2005.
Levillain, E., F. Gaillard, P. Leghie, A. Demortier, J. P. Lelieu. "On the Understanding of the Reduction of Sulphur (S8) in Dimethylformamide (DMF)", J. of Electoanalytical Chemistry, 1997, vol. 420, pp. 167-177.
International Search Report for PCT/GB2006/000103 mailed Jun. 20, 2007.
Written Opinion of the International Searching Authority Application No. PCT/GB2006/000103 mailed Jun. 20, 2007.
V.S. Kolosnitsyn, L.V. Sheina and S.E. Mochalov, "Physicochemical and Electrochemical Properties of Sulfolane Solutions of Lithium Salts", May 2008, pp. 575-578, MAIK Nauka/Interperiodica distributed exclusively by Springer Science+Business Media, LLC.
Broadhead, J., T. Skotheim, "A Safe, Fast-Charge, Two-Volt Lithium/Polymer Cathode 'AA'-Size Cell with a Greater than 250 Wh kg-1 Energy Density", Journal of Power Sources, 65 (1997), 1-2, 213-218.
Peled E., Gorenshtein A., Segal M., Sternberg Y., "Rechargeable Lithium-Sulphur Battery (extended abstract)", J. of Power Sources, 1989, vol. 26, pp. 269-271.
Peled E., Sternberg Y., Gorenshtein A., Lavi Y., "Lithium-Sulphur Battery: Evaluation of Dioxolane-Based Electrolytes", J. Electrochem. Soc., 1989, vol. 136, No. 6, pp. 1621-1625.
Rauh R.D., Abraham K. M., Pearson G. F., Surprenant J.K., Brummer S.B., "A Lithium/Dissolved Sulphur Battery with an Organic Electrolyte", J. Electrochem. Soc., 1979, vol. 126, No. 4, pp. 523-527.
Rauh R.D., Shuker F. S., Marston J. M., Brummer S. B., "Formation of Lithium Polysulphides in Aprotic Media", J. Inorg. Nucl. Chem., 1977, vol. 39, pp. 1761-1766.
Shin-Ichi Tobishima, Hideo Yamamoto, Minoru Matsuda, "Study on the Reduction Species of Sulphur by Alkali Metals in Nonaqueous Solvents", Electrochimica Acta, 1997, vol. 42, No. 6, pp. 1019-1029.
Taitiro Fujnaga, Tooru Kuwamoto, Satoshi Okazaki, Masashi Horo, "Electrochemical Reduction of Elemental Sulphur in Acetonitrile", Bull. Chem. Soc. Jpn. 1980, vol. 53, pp. 2851-2855.
Tarascon and Guyomard, J. Electrochem. Soc., 1999, 138, 2864-2868.
UK Search Report under Section 17 taken from Application No. GB 0416708.6, Aug. 10, 2004.
Yamin H., Gorenshtein A., Penciner J., Sternberg Y., Peled E., "Lithium Sulphur Battery. Oxidation/Reduction Mechanisms of Polysulphides in THF Solution", J. Electrochem. Soc., 1988, vol. 135, No. 5, pp. 1045-1048.
Yamin H., Penciner J., Gorenshtein A., Elam M., Peled E., "The Electrochemical Behavior of Polysulphides in Tetrahydrofuran", J. of Power Sources, 1985, vol. 14, pp. 129-134.
Yamin H., Peled E., "Electrochemistry of a Nonaqueous Lithium/Sulphur Cell", J. of Power Sources, 1983, vol. 9, pp. 281-287.

* cited by examiner

ELECTROLYTE COMPOSITIONS FOR BATTERIES USING SULPHUR OR SULPHUR COMPOUNDS

PRIOR APPLICATION DATA

This application is a continuation of U.S. patent application Ser. No. 11/332,471, filed on Jan. 17, 2006, now abandoned, which claims benefit from prior U.S. provisional application Ser. No. 60/652,769, filed Feb. 15, 2005, entitled "ELECTROLYTE COMPOSITIONS FOR BATTERIES USING SULPHUR OR SULPHUR COMPOUNDS", and claims benefit from prior UK patent application number 0501001.2 filed Jan. 18, 2005, each of which is hereby incorporated in its entirety by reference herein.

FIELD OF THE INVENTION

The present invention relates to electrolyte compositions for chemical sources of electric energy comprising positive electrodes (cathodes) and negative electrodes (anodes). In particular, embodiments of the invention relate to rechargeable (secondary) battery cells comprising a negative electrode (made of lithium, sodium or another active material or composition) providing ions (anode), an intermediate separator element containing a liquid or gel electrolyte solution through which ions from a source electrode material move between cell electrodes during charge and discharge cycles of the cell, and a positive electrode (cathode) comprising sulphur, organic or inorganic compounds based on sulphur as an electrode depolarizer substance (cathode active material). Embodiments of the invention also relate to chemical sources of electric energy comprising said electrolytes. Further embodiments of the invention relate to the composition of electrolyte systems comprising nonaqueous aprotic solvents, lithium salts and modifying additives and designed for use in lithium-sulphur batteries.

BACKGROUND OF THE INVENTION

Throughout this application various patents and published patent applications are referred to by an identifying citation. The disclosures of the patents and published patent applications referred to in this application are hereby incorporated by reference into the present disclosure to more fully describe the state of the art to which this invention pertains.

An electroactive material that has been fabricated into a structure for use in a battery is referred to as an electrode. Of a pair of electrodes used in a battery, herein referred to as a chemical source of electrical energy, the electrode on the side having a higher electrochemical potential is referred to as the positive electrode, or the cathode, while the electrode on the side having a lower electrochemical potential is referred to as the negative electrode, or the anode.

An electrochemically active material used in the cathode or positive electrode is referred to hereinafter as a cathode active material. An electrochemically active material used in the anode or negative electrode is hereinafter referred to as an anode active material. Multi-component compositions possessing electrochemical activity and comprising an electrochemically active material and optional electron conductive additive and binder, as well as other optional additives, are referred to hereinafter as electrode compositions. A chemical source of electrical energy or battery comprising a cathode with the cathode active material in an oxidized state and an anode with the anode active material in a reduced state is referred to as being in a charged state. Accordingly, a chemical source of electrical energy comprising a cathode with the cathode active material in a reduced state, and an anode with the anode active material in an oxidized state, is referred to as being in a discharged state.

A lithium, sodium or other alkali metal salt or mixture of such salts dissolved in a solvent or mixture of solvents so as to maintain conductivity in the solution is referred to hereinafter as a supporting salt.

There is a wide variety of electroactive materials that may be utilized in the cathode active layers of chemical sources of electrical energy. For example, a number of these are described in U.S. Pat. No. 5,919,587 to Mukherjee et al. These electroactive materials vary widely in their specific densities ($g/cm^3$) and in their specific capacities (mAh/g) so the desired volumetric densities in $mg/cm^3$ of the electroactive material in the cathode active layer correspondingly vary over a wide range. Lithium and sulphur are highly desirable as the electrochemically active materials for the anode and cathode, respectively, of chemical sources of electrical energy because they provide nearly the highest energy density possible on a weight or volume basis of any of the known combinations of active materials. To obtain high energy densities, the lithium may be present as the pure metal, in an alloy, or in an intercalated form, and the sulphur may be present as elemental sulphur or as a component in an organic or inorganic material with high sulphur content, preferably above 75 weight percent sulphur. For example, in combination with a lithium anode, elemental sulphur has a specific capacity of 1680 mAh/g. This high specific capacity is particularly desirable for applications such as portable electronic devices and electric vehicles, where low weight of the battery is important.

Solutions of lithium salts with large anions in individual aprotic dipole solvents and their mixtures are widely used as electrolytes in lithium and lithium-ion rechargeable batteries. The main requirements of these electrolytes are:
high conductivity;
capability to stay in a liquid or gel (for gel electrolytes) state over a wide temperature region;
high stability against electrode active materials;
chemical and electrochemical stability (wide electrochemical stability region);
fire and explosion safety;
nontoxicity.

High conductivity over a wide temperature range is the main of the above mentioned requirements. The electrolyte conductivity is determined by the physical and chemical properties of the solvents and salts. To obtain high conductivity, it is preferred to use solvents having high donor characteristics, a high dielectric constant, and low viscosity, thus providing a high dielectric dissociation degree for the lithium salts. Lithium salts with large anions are preferably used since these have a high dissociation ability.

The conductivity of the salt solutions is determined by their concentration. With an increase of salt concentration, the conductivity at first increases, then reaches a maximum and finally decreases. The salt concentration is usually chosen to provide maximum conductivity of the resulting electrolyte [Lithium batteries: Science and Technology; Gholam-Abbas Nazri and Gianfranco Pistoia (Eds.); Kluwer Academic; published 2004; pp. 509-573].

Solutions of one or several lithium salts in individual solvents or their mixtures are also used as electrolytes in lithium-sulphur batteries [U.S. Pat. No. 6,030,720, Chu et al]. The choice of solvents is the main concern when designing electrolytes for lithium-sulphur batteries because the nature (the physical and chemical properties) of the solvents has the principal influence on the battery properties.

The electrolyte salts that are used in the main prior art lithium and lithium-ion batteries can be used as supporting salts in lithium-sulphur batteries. As a rule, prior art patent disclosures of which the present applicant is aware do not provide recommendations for specific preferable salt concentrations, but instead give a very wide range of possible concentrations.

The nearest closest prior art to the present invention is currently believed to be described in U.S. Pat. No. 6,613,480 to Hwang, et al. The text of the patent discloses the information that electrolyte salts for lithium-sulphur batteries can be chosen from a list containing: lithium hexafluorophosphate ($LiPF_6$), lithium hexafluorarsenate ($LiAsF_6$), lithium perchlorate ($LiClO_4$), lithium sulfonylimid trifluoromethane ($LiN(CF_3SO_2)_2$)) and lithium trifluorosulfonate ($CF_3SO_3Li$). The electrolyte salt concentration should be taken from the range of 0.5 to 2.0M.

High conductivity over a wide temperature range (together with electrochemical stability) is the main requirement of the electrolyte compositions used in lithium and lithium-ion batteries with traditional hard cathode active materials. The choice of the electrolyte composition for lithium-sulphur batteries is much harder because the sulphur may dissolve in the electrolyte solvents and react with their components, with this having a major influence on the battery properties.

Despite the numerous electrolyte solvents and electrolyte salts proposed for use in rechargeable cells, there remains a need for improved non-aqueous electrolyte compositions that provide beneficial effects during the useful life of the chemical sources of electric energy comprising sulphur-based positive electrode active material.

SUMMARY OF THE INVENTION

Embodiments of the present invention may provide an improved non-aqueous electrolyte composition which is suitable for use in rechargeable cells comprising sulphur-based positive electrode active material and which has greater temperature stability and conductivity and provides a higher cycling efficiency and long cycle life of the battery.

Embodiments of the present invention relate to electrolytes for lithium-sulphur batteries, such as electrolytes comprising solutions of lithium salts with large anions in aprotic polar solvents with predetermined concentrations of supporting salts. In particular, embodiments of the present invention may provide the use of lithium salts or mixtures of lithium salts in an electrolyte at a concentration substantially equal to or at least close to a concentration of saturated solution of the lithium salt (or salts) in the solvent (or mixture of solvents). The use of such electrolytes in lithium-sulphur batteries provides improved efficiency and cycling duration.

According to a first aspect of the present invention, there is provided an electrolyte composition for a sulphur-based chemical source of electric energy, the electrolyte composition comprising at least one nonaqueous aprotic solvent, at least one alkali metal salt, and optional modifying additives, wherein said electrolyte composition is chosen in a way that a concentration of the at least one salt is substantially equal to or close to a saturation concentration of the at least one alkali metal salt in the at least one solvent.

Preferably, the concentration of the at least one salt is at least 90%, preferably at least 95%, and even more preferably at least 99% of the saturation concentration.

The at least one salt can be a single salt or a mixture of alkali metal salts. Lithium salts are particularly preferred, but sodium and other alkali metal salts and mixtures thereof may also be used.

Examples of lithium salts include lithium hexafluorophosphate ($LiPF_6$), lithium hexafluoroarsenate ($LiAsF_6$), lithium perchlorate ($LiClO_4$), lithium bis(trifluoromethane sulfonyl) imide ($LiN(CF_3SO_2)_2$)) and lithium trifluorosulfonate ($LiCF_3SO_3$).

The at least one aprotic solvent can be a single solvent or a mixture of solvents selected from a group comprising: tetrahydrofurane, 2-methyltetrahydrofurane, dimethylcarbonate, diethylcarbonate, ethylmethylcarbonate, methylpropylcarbonate, methylpropylpropyonate, ethylpropylpropyonate, methylacetate, ethylacetate, propylacetate, dimethoxyethane, 1,3-dioxalane, diglyme (2-methoxyethyl ether), tetraglyme, ethylenecarbonate, propylenecarbonate, γ-butyrolactone, sulfolane, and at least one sulfone.

According to a second aspect of the present invention, there is provided a chemical source of electrical energy comprising a negative electrode (anode) including an anode active material for providing ions, a positive electrode (cathode) including a cathode active material comprising sulphur or organic or inorganic compounds based on sulphur, and an intermediate separator element containing a liquid or gel electrolyte solution through which ions from the negative electrode move to the positive electrode during charge and discharge cycles of the chemical source of electrical energy, wherein the electrolyte solution comprises an electrolyte composition according to the first aspect of the present invention.

The chemical source of electrical energy may be a cell or battery.

The anode active material may comprise an alkali metal such as lithium or sodium or another active material or composition.

Particularly preferred anode active materials include metallic lithium, alloys of lithium, metallic sodium, alloys of sodium, alkali metals or alloys thereof, metal powders, alkali metal-carbon and alkali metal-graphite intercalates, compounds capable of reversibly oxidizing and reducing with an alkali metal ion, and mixtures thereof.

The cathode active material containing sulphur may be selected from a group comprising: elemental sulphur, lithium polysulphides ($Li_2S_n$ with n≥1), non-organic and organic (including oligomeric and polymeric) compounds based on sulphur, and mixtures thereof.

The cathode active material may additionally include a binder and an electrically conductive material.

BRIEF DESCRIPTION OF THE DRAWINGS

For a better understanding of the present invention and to show how it may be carried into effect, reference shall now be made by way of example to the accompanying drawings, in which.

DETAILED DESCRIPTION OF THE INVENTION

Fast capacity fade and relatively low cycling efficiency are the main problems encountered when designing lithium-sulphur batteries. Irreversible transfer of sulphur from the positive electrode (cathode) to the surface of the negative electrode (anode) and its accumulation there in the form of lithium sulphide or disulphide is one of the major reasons for capacity fade during cycling of lithium-sulphur cells. The low cycling efficiency of lithium-sulphur batteries is caused by the reversible transfer of sulphur in the middle of the charge and discharge process. This transfer results in what is known as the sulphide cycle, i.e. the energy transfer inside the battery (in its internal circuit).

Elemental sulphur and the end products of sulphur reduction (lithium sulphide or disulphide) are known to be poorly soluble in most organic solvents. In contrast, lithium polysulphides (intermediate forms produced during the reduction of elemental sulphur or during oxidation of lithium sulphide and disulphide) are well soluble in many organic solvents.

The rate of sulphur transfer between the positive and negative electrodes of lithium-sulphur batteries is determined by the form of sulphur present in the electrolyte solution. The form of sulphur and sulphur-lithium compounds present in the electrolytes of lithium-sulphur batteries depends on the electrolyte system composition and the properties thereof. In particular, it depends on the polarity and donor properties of the solvents used and by the concentration of the supporting salts.

Lithium polysulphides may be present in electrolyte systems in three forms: molecular, mono-anionic, and di-anionic. Hence sulphur in the electrolyte can be transferred either in molecular (neutral) or in ionic (anionic) form. The diffusion of elemental sulphur and non-dissociated lithium polysulphides dissolved in the electrolyte contributes to the molecular transfer of sulphur. The diffusion and electromigration of the mono- and di-anions of polysulphides, as well as sulphur anion-radicals, contributes to the ionic form of sulphur transfer. The existence of two mechanisms increases the overall sulphur transfer. The sulphur transfer will be higher in the case of a diffusion-migration process as compared to a pure diffusion mechanism. As a result, the rate of capacity fade and the cycling efficiency of lithium-sulphur batteries are dependent on the form of the sulphur present in the electrolyte solution and the form of sulphur transfer from the positive electrode to the interelectrode space and thence to the surface of the negative electrode. The rate of capacity fade for lithium-sulphur batteries will be much lower and their cycling efficiency will be much higher if the sulphur is present as neutral particles (molecular form) as opposed to charged particles (ionic form).

The degree of electrolytic dissociation of each salt in the electrolyte solution will be determined by their respective concentrations and dissociation constants in the presence of two or more different salts in the electrolyte composition (here, for example, lithium polysulphides and the supporting salts). Based on the nature of the relevant anions, the present applicant believes that the electrolytic dissociation constants of lithium polysulphides are much lower than those of most lithium salts that may be used as supporting salts. In this case, with an increase in the supporting salt concentration, the equilibrium in the dissociation reaction of lithium polysulphides will shift towards a greater presence of the molecular form rather than the ionic form.

Accordingly, the dissociation degree of lithium polysulphides will decrease with an increase in the concentration of the supporting salts. Hence, a decrease should be found in the rate of sulphur transfer between the electrodes and, correspondingly, in the rate of the capacity fade of a lithium-sulphur cell during cycling thereof.

Moreover, the cycling efficiency should increase as a result of the rate decrease of the sulphide cycle. This is clearly shown in the examples that follow.

When forming the electrolyte compositions of embodiments of the present invention, the following considerations may be taken into account:

1) The electrolyte composition should comprise a non-aqueous aprotic solvent, lithium or another alkali metal salt and optional modifying additives.

2) Said salt can be an individual salt or a number of different salts.

3) Said salt or number of salts are dissolved in an individual aprotic polar solvent or a mixture of solvents.

4) Said electrolyte composition should be chosen in a way that the concentration of the lithium salt or the mixture of salts is equal (or close) to the concentration of a saturated solution of the salt or salts used in the solvent or mixture of solvents.

In generally, batteries or other devices, or compositions such as electrolyte compositions, or chemical sources of electric energy, according to embodiments of the present invention operate at certain temperature and pressure ranges.

For example, in one embodiment, the operating temperature may be approximately −40 to +150 degrees Celsius. In another embodiment, the operating temperature may be approximately −20 to +110 degrees C., or −10 to +50 degrees C.

In one embodiment, the operating pressure may be approximately 5 mmHg to 76000 mmHg (0.0066 to 100 atm). In another embodiment, the operating pressure may be approximately 20 mmHg to 38000 mmHg (0.026 to 50 atm), or for example approximately 1 atm.

Embodiments of the present invention may operate at standard temperature and pressure, for example at approximately 25 degrees C. and 1 atm.

Embodiments of the present invention may operate at other temperature and pressure ranges.

EXAMPLE 1

Figure 1:
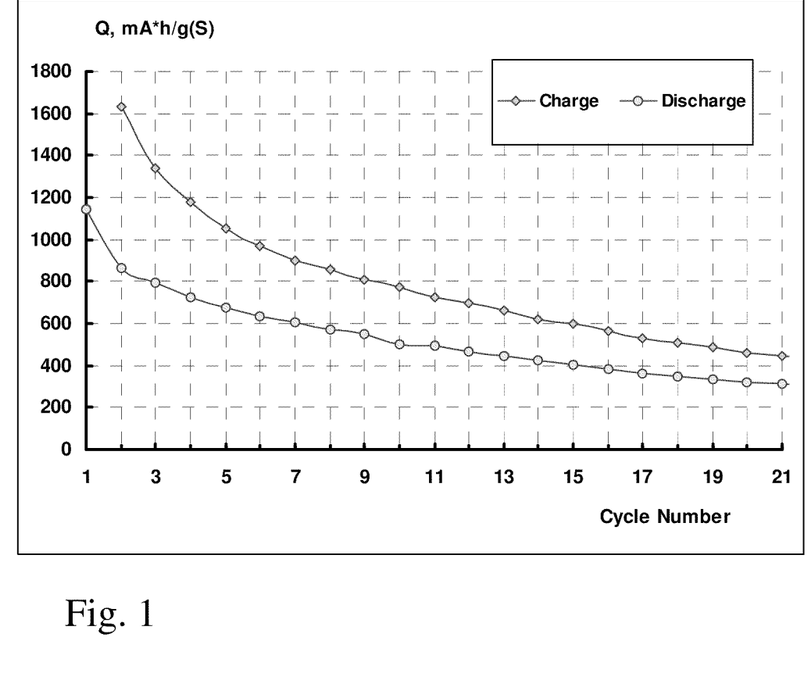
FIG. 1 is a graph showing charge and discharge capacity fade during cycling of a standard lithium-sulphur cell.

A lithium-sulphur cell was produced by assembling an anode made of metal lithium foil; a porous separator Celgard 2500 (a registered trademark of Celgard Inc., available from Celgard K.K., Tokyo, Japan, and also available from Celgard Inc. South Lakes, N.C. USA.); and a sulphur cathode comprising elemental sulphur as a depolariser (70% by weight), a carbon electro-conducting additive (10% by weight) Ketjenblack EC-600JD (available from Akzo Nobel Polymer Chemicals BV, Netherlands), and a binder (polyethyleneoxide with molecular mass 4000000—20% by weight). The sulphur cathode was deposited by an automatic film applicator Elcometer SPRL onto one side of an 18 micrometer thick conductive carbon coated aluminium foil (available from InteliCoat®, South Hadley, Mass.) as a current collector and substrate. A specific surface capacity of the cathode was 1 mAh/cm$^2$. The assembled cell was filled with an electrolyte comprising a 0.1M solution of $LiClO_4$ in sulpholane. All stages of the cell assembling and filling were performed in a "Jacomex Type BS531" glove box. The cell was cycled at a charge and discharge rate of 0.25 C and at a temperature of 25° C. The change in the charge and discharge capacity of the cell during the cycling is shown in FIG. 1. FIG. 1 depicts curves of the sulphur electrode capacity change in a lithium-sulphur battery during cycling, according to one embodiment of the invention. In FIG. 1, the electrolyte is 0.1 M $LiClO_4$ solution in sulpholane, the charge rate is 0.25 C, and the discharge rate is 0.25 C.

Figure 2:
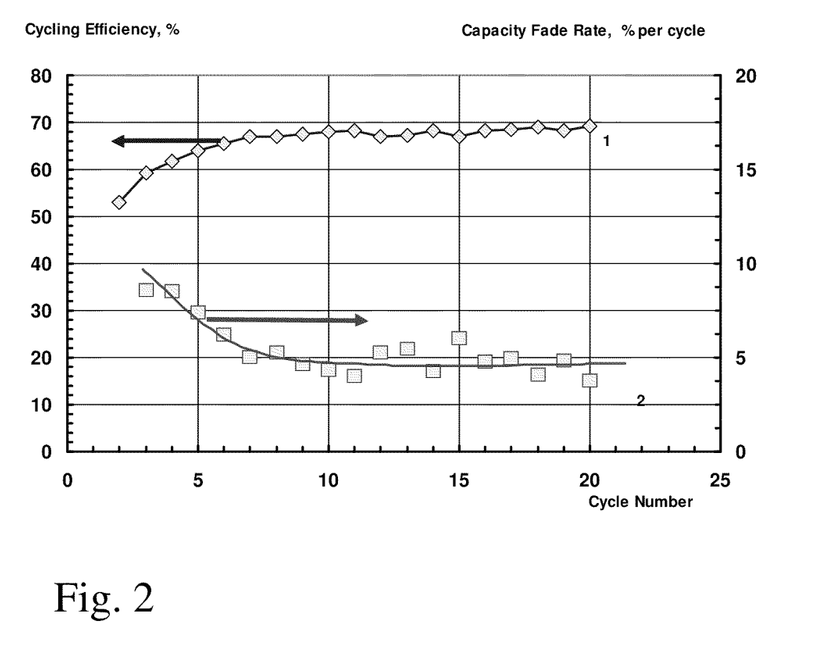
FIG. 2 is a graph showing changes in the cycling efficiency and capacity fade rate for the standard lithium-sulphur cell.

The change of the cycling efficiency and the rate of the capacity fade during cycling are shown in FIG. 2. In FIG. 2, the electrolyte is 0.1 M $LiClO_4$ solution and the average capacity fade rate is 4.5%.

The cycling efficiency is calculated as the ratio between the discharge capacity and the charge capacity expressed as a percentage. The rate of the capacity fade is calculated as the difference of the capacity at two cycles, following each other, divided by the mean capacity at these cycles and expressed as a percentage. As can be seen in FIG. 2, the efficiency of cycling and the rate of capacity fade initially change after the beginning of cycling, but later on they stabilize. The mean cycling efficiency between the 10$^{th}$ and 20$^{th}$ cycles was 68%, and the rate of the capacity fade was 4.5%.

EXAMPLE 2

Figure 3:
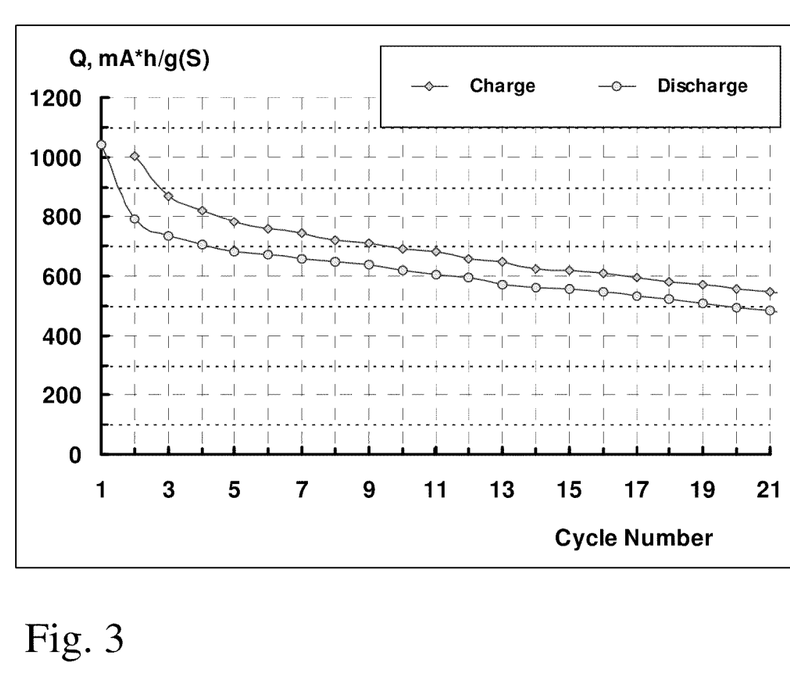
FIG. 3 is a graph showing charge and discharge capacity fade during cycling of a second lithium-sulphur cell with a more concentrated electrolyte.

A lithium-sulphur cell was produced as described in the Example 1, but this time the assembled cell was filled with an electrolyte comprising a 1M solution of $LiClO_4$ in sulpholane. The cell was cycled at a charge and discharge rate of 0.25 C and at a temperature of 25° C. The change in the charge and discharge capacity of the cell during the cycling is shown in Figure, showing the capacity fade of the sulphur electrode in lithium-sulphur cell during cycling. In FIG. 3, the electrolyte is a 1 M solution of $LiClO_4$ in sulpholane, the charge rate is 0.25 C, and the discharge rate is 0.25 C.

Figure 4:
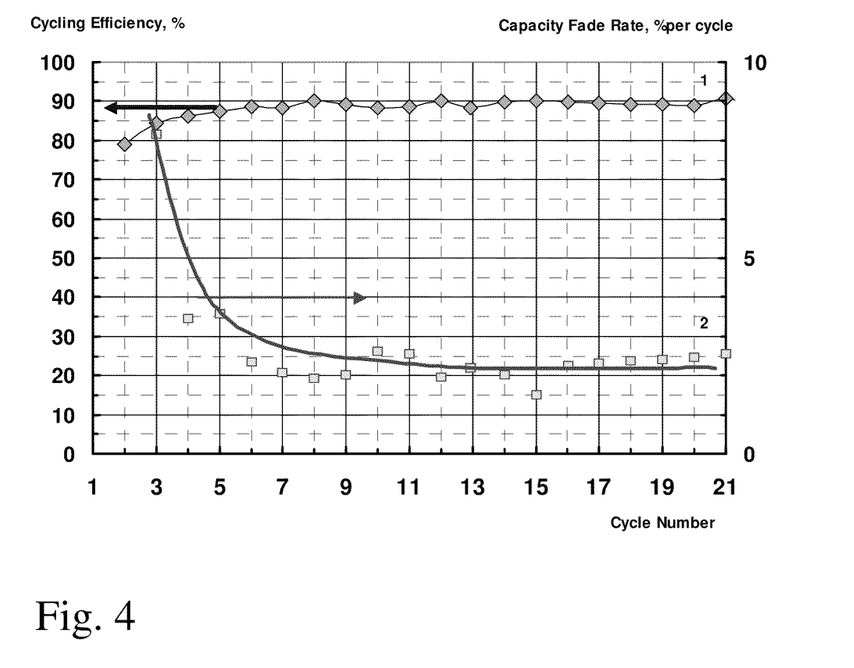
FIG. 4 is a graph showing changes in the cycling efficiency and capacity fade rate for the second lithium-sulphur cell.

The change in the cycling efficiency and the rate of the capacity fade during cycling are shown in FIG. 4. In FIG. 4 the electrolyte is 1 M solution of $LiClO_4$ in sulpholane.

As can be seen in FIG. 4, the efficiency of cycling and the rate of capacity fade initially change after the beginning of cycling, but later on they stabilize. The mean cycling efficiency between the 10$^{th}$ and 20$^{th}$ cycles was 90%, and the rate of the capacity fade was 2.25%. This is a marked improvement over the cell of Example 1.

EXAMPLE 3

Figure 5:
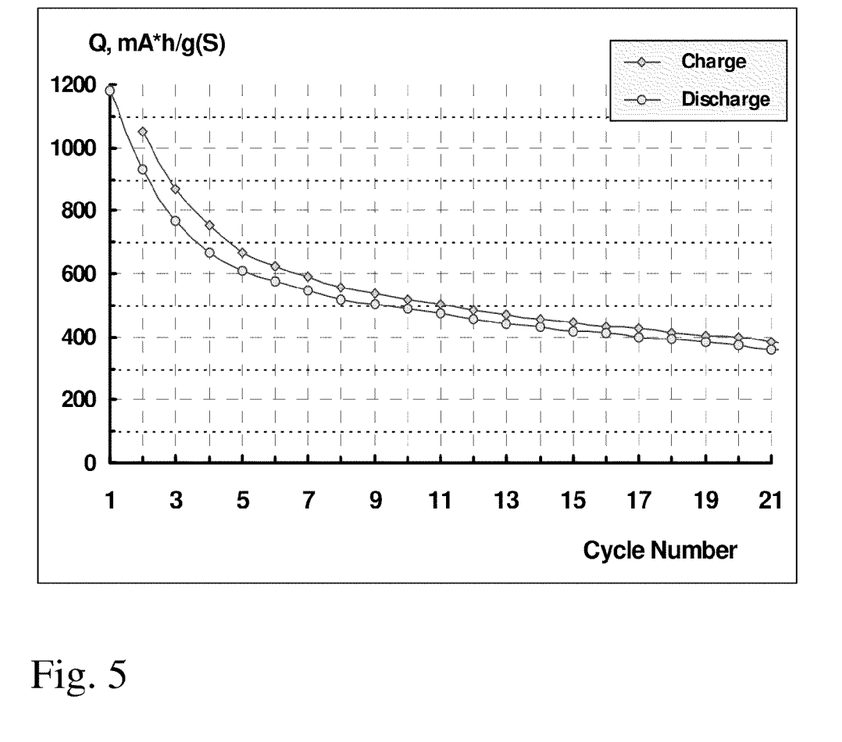
FIG. 5 is a graph showing charge and discharge capacity fade during cycling of a third lithium-sulphur cell with a saturated electrolyte solution in accordance with an embodiment of the invention.

A lithium-sulphur cell was produced as described in the Example 1, but this time the assembled cell was filled with an electrolyte comprising a 2M saturated solution of $LiClO_4$ in sulpholane in accordance with an embodiment of the present invention. The cell was cycled at a charge and discharge rate of 0.25 C and at a temperature of 25° C. The change in the charge and discharge capacity of the cell during the cycling is shown in FIG. 5, showing the capacity fade of a sulphur electrode in a lithium-sulphur cell during cycling. In FIG. 5, the electrolyte is a 2 M solution of $LiClO_4$ in sulpholane, the charge rate is 0.25 C, and the discharge rate is 0.25 C.

Figure 6:
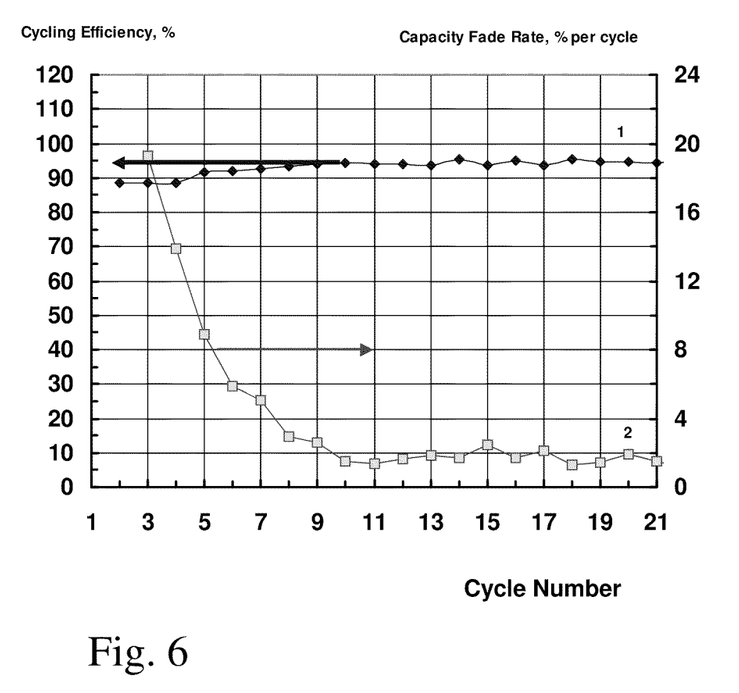
FIG. 6 is a graph showing changes in the cycling efficiency and capacity fade rate for the third lithium-sulphur cell.

The change in the cycling efficiency and the rate of the capacity fade during cycling are shown in FIG. 6. In FIG. 6, the electrolyte is 2 M solution of $LiClO_4$ in sulpholane. As can be seen in FIG. 6, the efficiency of cycling and the rate of capacity fade initially change after the beginning of cycling, but later on they stabilize. The mean cycling efficiency between the 10$^{th}$ and 20$^{th}$ cycles was 96%, and the rate of the capacity fade was 1.75%. This is a marked improvement over the cells of Examples 1 and 2.

EXAMPLE 4

Figure 7:
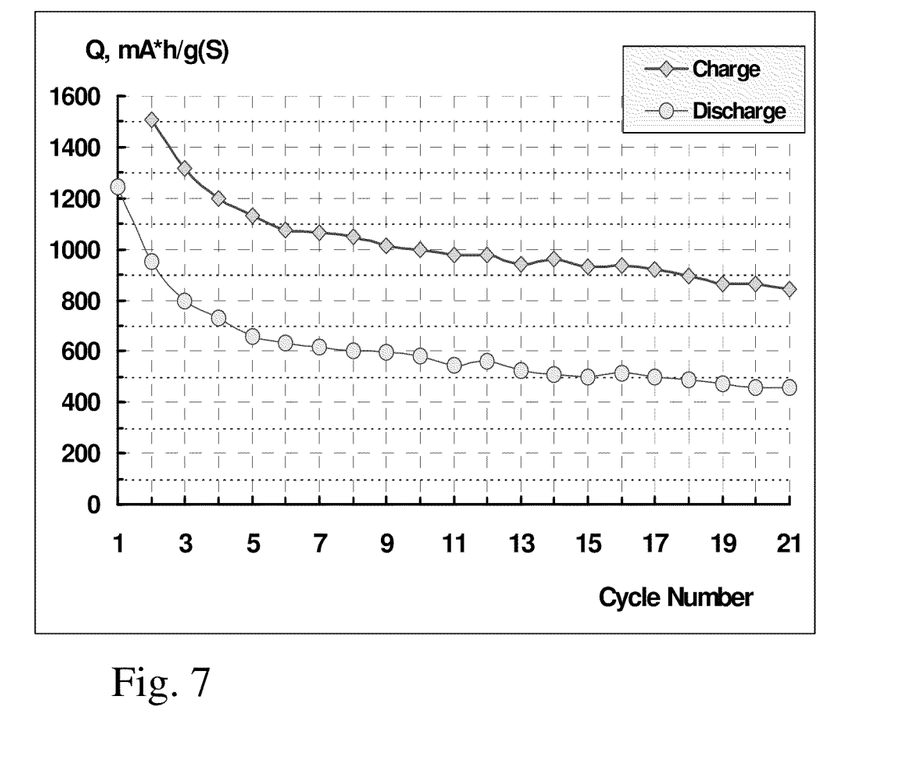
FIG. 7 is a graph showing charge and discharge capacity fade during cycling of a fourth lithium-sulphur cell with a different, non-saturated electrolyte.

A lithium-sulphur cell was produced as described in the Example 1, but this time the assembled cell was filled up with an electrolyte comprising a 0.1M solution of $LiClO_4$ in methylpropylsulfone. The cell was cycled at a charge and discharge rate of 0.25 C and at a temperature of 25° C. The change in the charge and discharge capacity of the cell during the cycling is shown in FIG. 7, showing the capacity fade of a sulphur electrode in lithium-sulphur cell during cycling. The electrolyte is a 0.1 M solution of LiClO4 in methylpropylsulfone, the charge rate is 0.25 C, and the discharge rate is 0.25 C.

Figure 8:
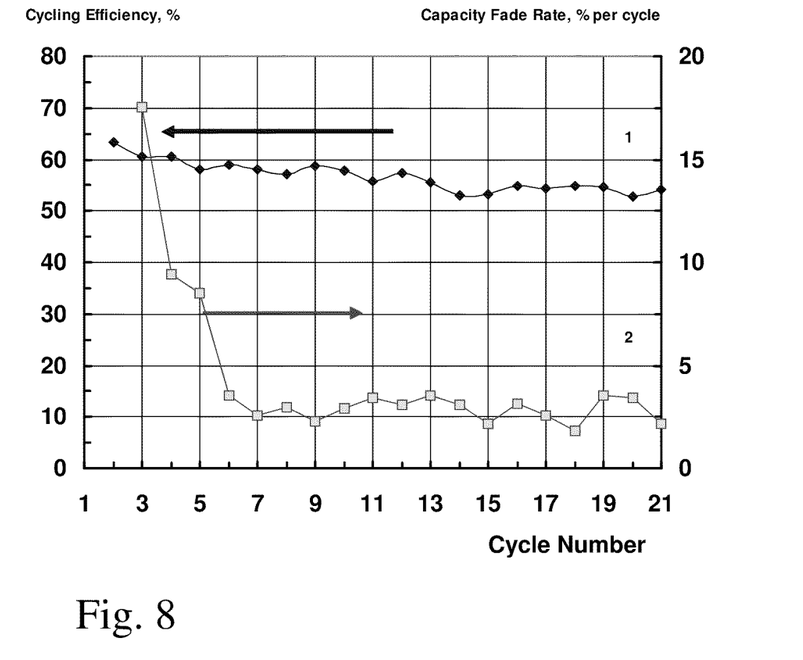
FIG. 8 is a graph showing changes in the cycling efficiency and capacity fade rate for the fourth lithium-sulphur cell.
Figure 9:
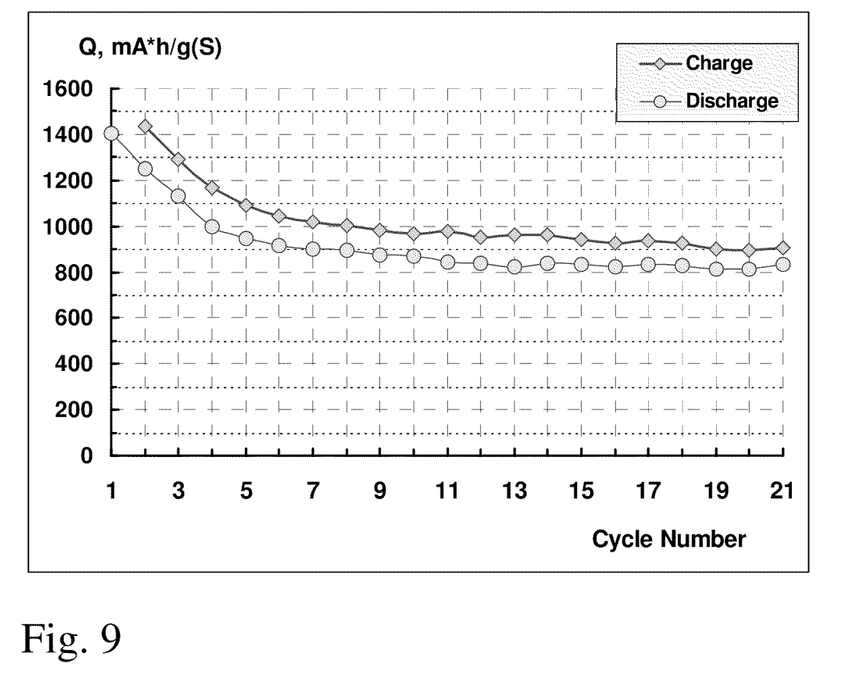
FIG. 9 is a graph showing charge and discharge capacity fade during cycling of a fifth lithium-sulphur cell with a saturated electrolyte solution in accordance with an embodiment of the invention, where the electrolyte is a 1.7 M solution of LiClO4 in methylpropylsulfone and the charge rate is 0.25 C and the discharge rate is 0.25 C.
Figure 10:
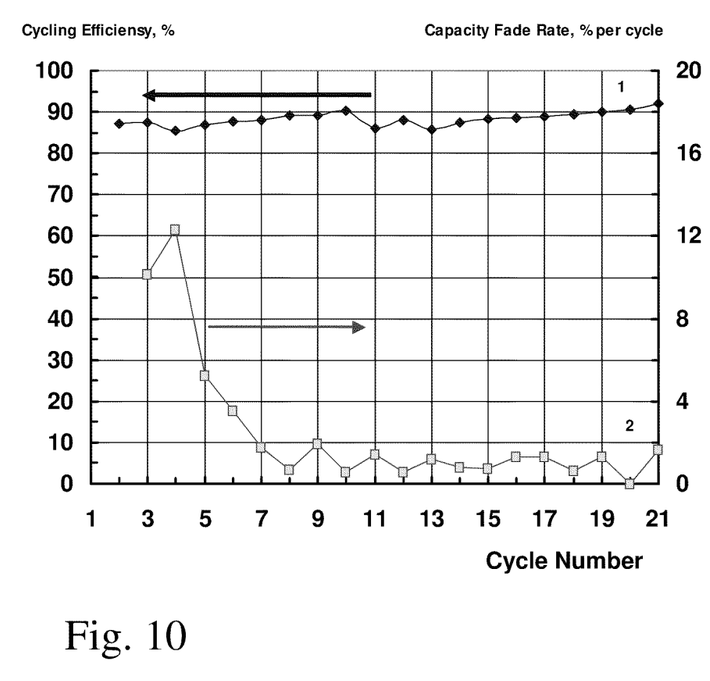
FIG. 10 is a graph showing changes in the cycling efficiency and capacity fade rate for the fifth lithium-sulphur cell, where the electrolyte is a 1.7 M solution of $LiClO_4$ in methylpropylsulfone.

The change in the cycling efficiency and the rate of capacity fade during cycling are shown in FIG. 8. In FIG. 8, the electrolyte is 0.1 M solution of LiClO4 in methylpropylsulfone. As can be seen in FIG. 8, the efficiency of cycling and the rate of capacity fade initially change after the beginning of cycling, but later on they stabilize. The mean cycling efficiency between the 10$^{th}$ and 20$^{th}$ cycles was 55%, and the rate of the capacity fade was 3.1%.

EXAMPLE 5

A lithium-sulphur cell was produced as is described in the Example 1, but this time the assembled cell was filled with an electrolyte comprising a 1.7M solution of $LiClO_4$ in methylpropylsulfone (the concentration close to the saturated solution). The cell was cycled at a charge and discharge rate of 0.25 C and at a temperature of 25° C. The change in the charge and discharge capacity of the cell during the cycling is shown in FIG. 7.

The change in the cycling efficiency and the rate of capacity fade during cycling are shown in FIG. 8. As can be seen in FIG. 8, the efficiency of cycling and the rate of capacity fade initially change after the beginning of cycling, but later on they stabilize. The mean cycling efficiency between the 10$^{th}$ and 20$^{th}$ cycles was 90%, and the rate of the capacity fade was 1.15%, which is a marked improvement over the cell of Example 4.

Examples 4 and 5 illustrate that the improvement in cycling efficiency and rate of capacity fade is independent of the chemical identity of the solvent, but instead depends on the electrolyte concentration.

While some embodiments of the invention have been illustrated and described, it is clear that the invention is not limited to these specific embodiments. Numerous modifications, changes, variations, substitutions, and equivalents will occur to those skilled in the art without departing from the scope of the present invention.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. A lithium-sulphur battery comprising:
a negative electrode (anode) comprising an anode active material for providing ions;
a positive electrode (cathode) comprising a cathode active material comprising elemental sulphur, organic sulphur compounds, inorganic sulphur compounds, or mixtures thereof; and
an intermediate separator element containing a liquid or a gel electrolyte solution through which ions from the negative electrode move to the positive electrode during charge and discharge cycles of the lithium-sulphur battery, wherein the liquid or gel electrolyte solution comprises:
a nonaqueous aprotic solvent and a lithium salt;
wherein a electrolyte composition is chosen in a way that a concentration of the lithium salt is at least 90% of a saturation concentration up to a concentration that is equal to the saturation concentration of the lithium salt in the solvent at operating temperature and pressure.

2. The lithium-sulphur battery as claimed in claim 1, wherein the nonaqueous aprotic solvent is selected from the group consisting of tetrahyrofuran, 2-methyltetrahydrofuran, dimethylcarbonate, diethylcarbonate, ethylmethylcarbonate, methylpropylcarbonate, methylpropylpropionate, ethylpropylpropionate, methylacetate, ethylacetate, propylacetate, dimethoxyethane, 1,3-dioxalane, diglyme (2-methoxyethyl ether), tetraglyme, ethylenecarbonate, propylenecarbonate, γ-butyrolactone, sulfolane, a sulfone, and a mixture thereof.

3. The lithium-sulphur battery as in claim 1, wherein the cathode active material is elemental sulphur.

4. The lithium-sulphur battery as in claim 3, wherein the positive electrode comprises polymeric organic sulphur compounds or oligomeric organic sulphur compounds.

5. The lithium-sulphur battery as in claim 1, wherein the cathode active material comprising sulphur further comprises a binder and an electrically conductive material.

6. The lithium-sulphur battery as in claim 1, wherein said anode active material is selected from the group consisting of metallic lithium, alloys of lithium, lithium metal-carbon and lithium metal-graphite intercalates, compounds capable of reversibly oxidizing and reducing with a lithium metal ion, and mixtures thereof.

7. The lithium-sulphur battery as claimed in claim 1, wherein the cathode active material comprises lithium polysulphide represented by the general formula $Li_2S_n$, where $n \geq 1$.

8. The lithium-sulphur battery as claimed in claim 1, wherein said electrolyte composition is chosen in the way that the concentration of the lithium salt is at least 95% of the saturation concentration up to a concentration that is equal to the saturation concentration of the lithium salt in the solvent at the operating temperature and pressure.

9. The lithium-sulphur battery as claimed in claim 1, wherein said electrolyte composition is chosen in the way that the concentration of the lithium salt is at least 99% of the saturation concentration up to a concentration that is equal to the saturation concentration of the lithium salt in the solvent at the operating temperature and pressure.

10. The lithium-sulphur battery as claimed in claim 1, wherein the nonaqueous aprotic solvent comprises a sulfone.

11. The lithium-sulphur battery as claimed in claim 1, wherein the nonaqueous aprotic solvent comprises sulfolane.

* * * * *